Aug. 22, 1933.  I. M. CHAMBERS  1,923,255
TRAILER VEHICLE
Filed July 2, 1932  4 Sheets-Sheet 1
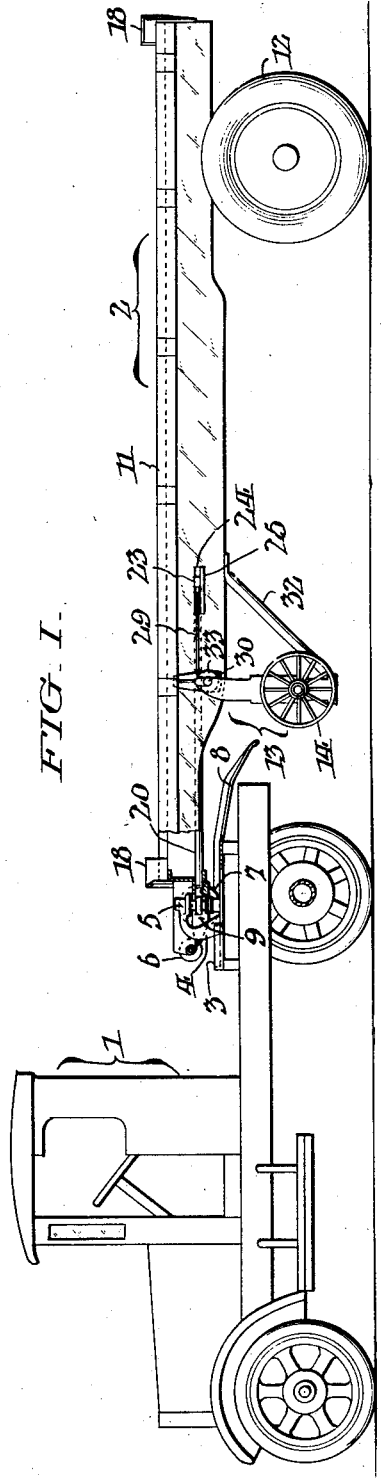
FIG. I.
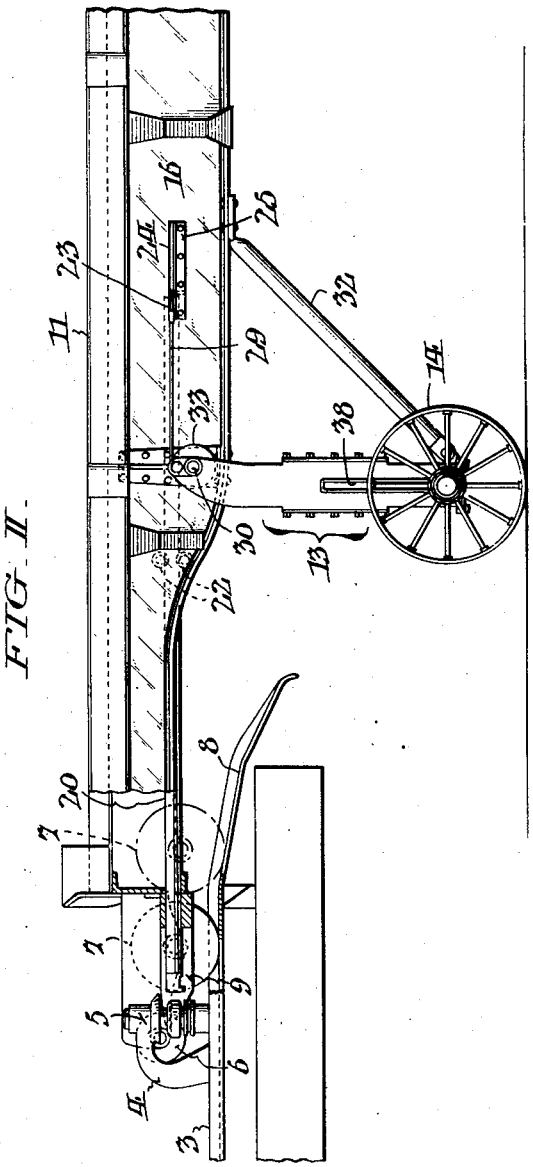
FIG. II.
INVENTOR:
Isaac M. Chambers,
BY Fraley Paul
ATTORNEYS.

Aug. 22, 1933.  I. M. CHAMBERS  1,923,255
TRAILER VEHICLE
Filed July 2, 1932  4 Sheets-Sheet 2
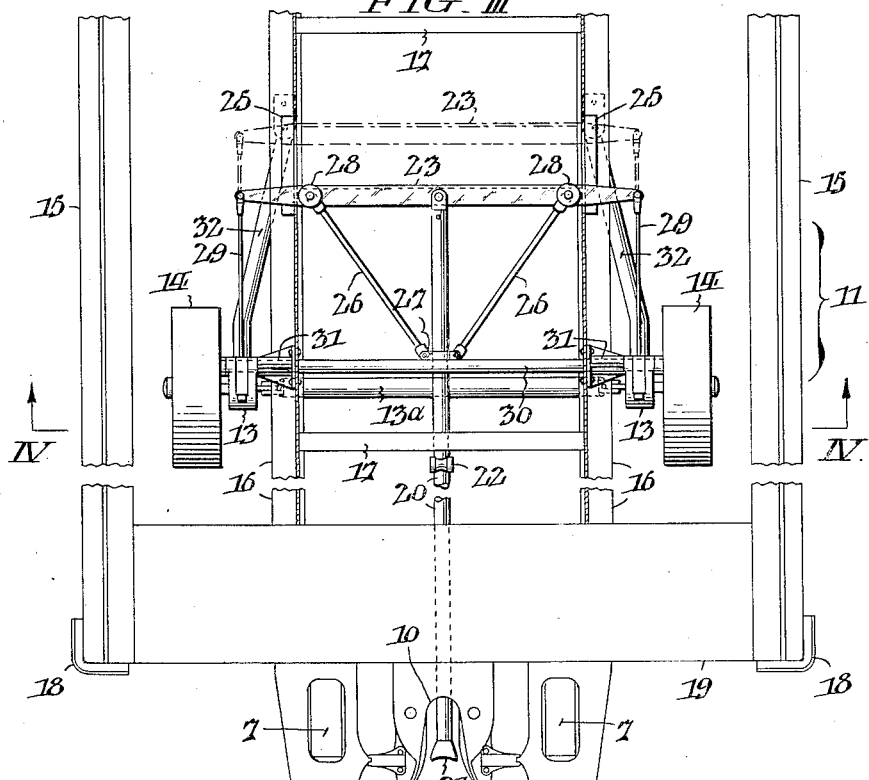
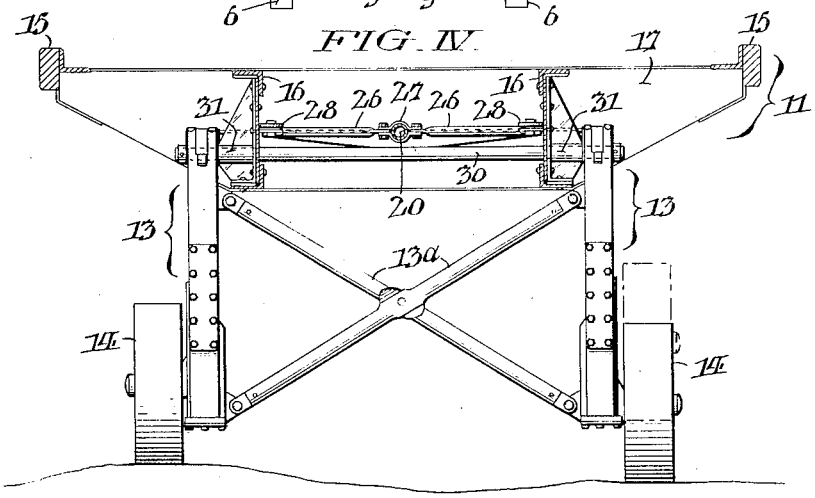
WITNESSES:  INVENTOR:
Isaac M. Chambers,
BY
ATTORNEYS.

Aug. 22, 1933.     I. M. CHAMBERS     1,923,255
TRAILER VEHICLE
Filed July 2, 1932     4 Sheets-Sheet 3
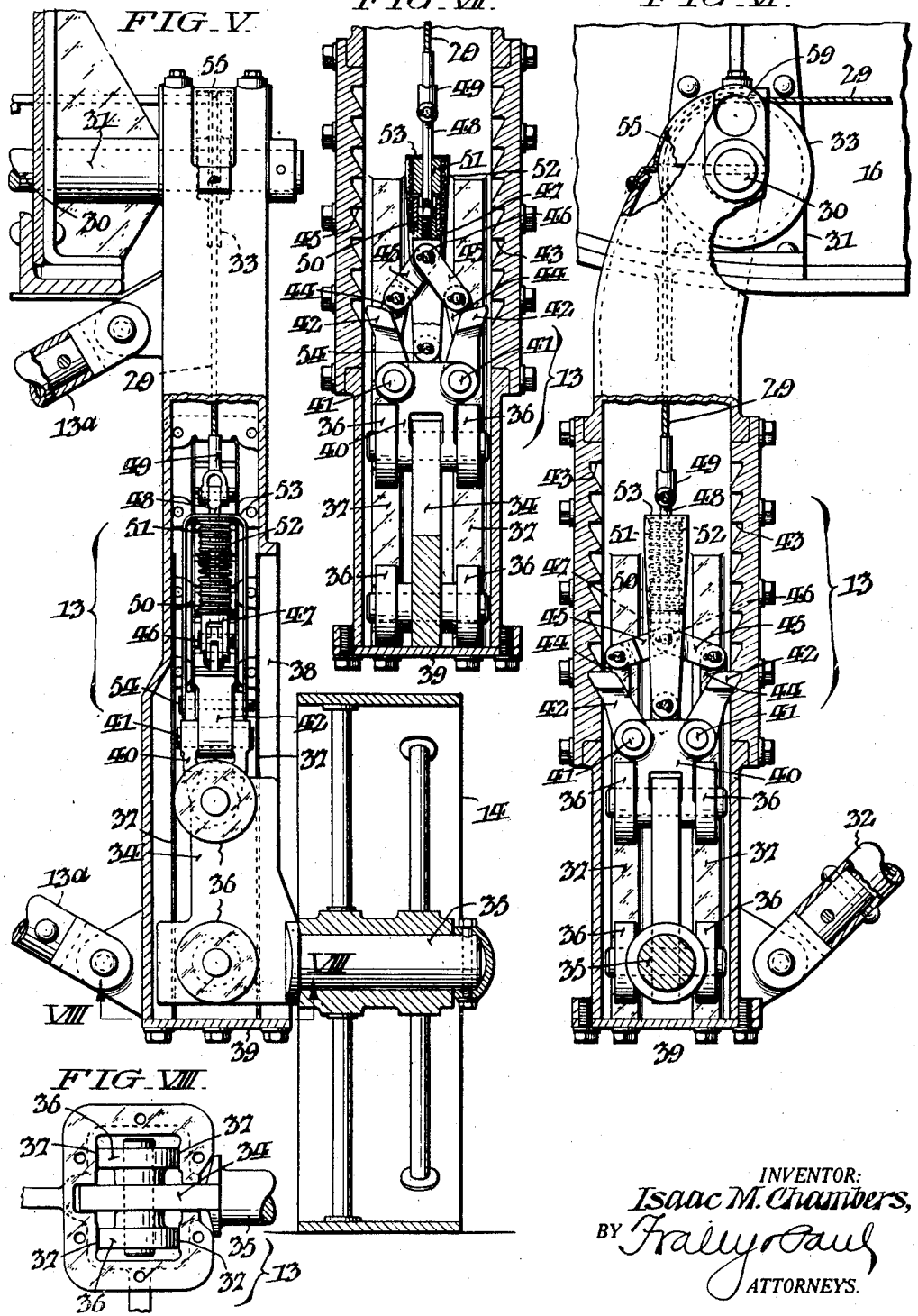
INVENTOR:
Isaac M. Chambers,
BY [signature]
ATTORNEYS.

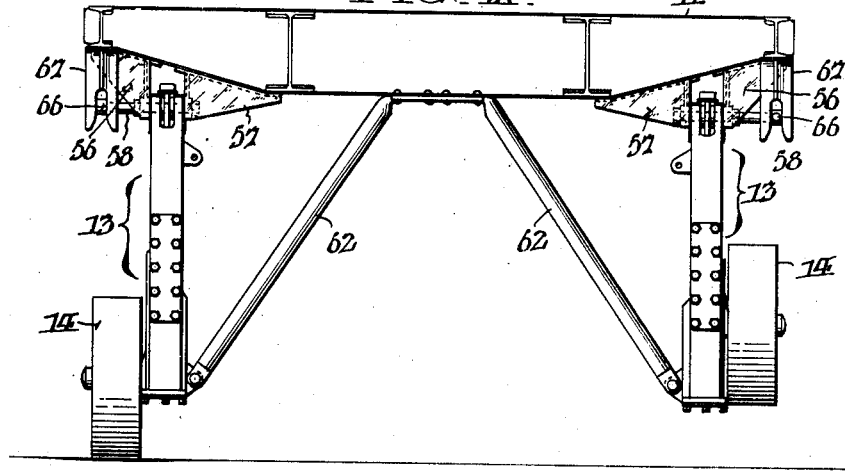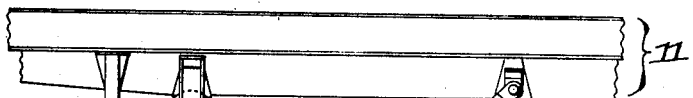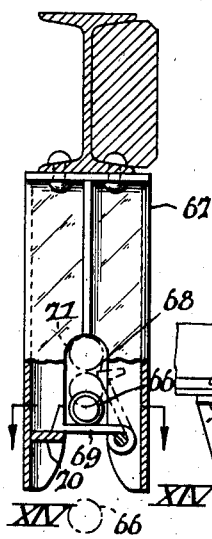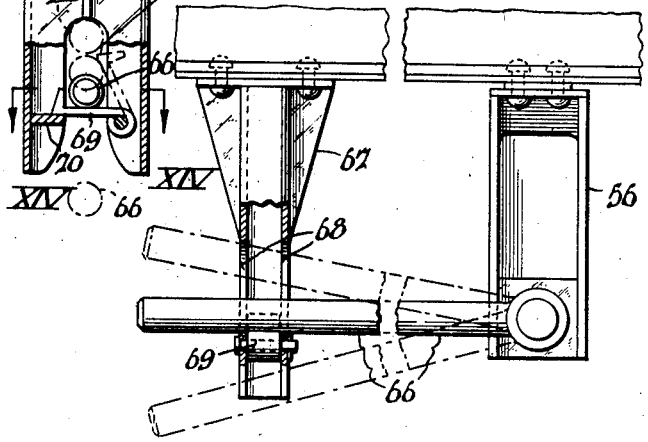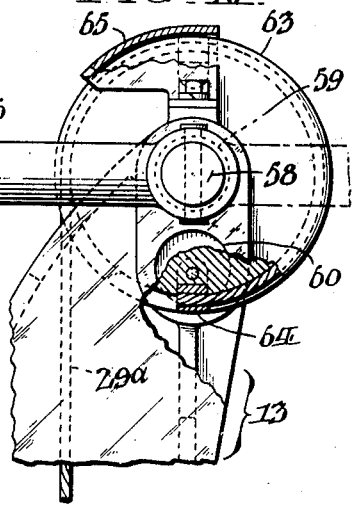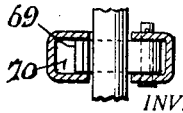

Patented Aug. 22, 1933

1,923,255

UNITED STATES PATENT OFFICE 1,923,255

TRAILER VEHICLE

Isaac M. Chambers, Altoona, Pa.

Application July 2, 1932. Serial No. 620,708

11 Claims. (Cl. 280—33.1)

My invention relates to trailer vehicles of the type commonly known as "semi-trailers", such vehicles being adapted to be supported at their forward ends upon the rear of a tractor and to be connected thereto by a swivel coupling. More particularly, the invention has reference to an adjustable front support which permits the trailer to stand alone when disengaged from its tractor, and which has thereon ground engaging means, such as relatively small wheels, which are capable of being raised to a position well clear of the roadway when the trailer is coupled to its tractor.

Heretofore it has been proposed to employ for the front supports of semi-trailers, legs pivotally suspended from the undersides of the frame and capable of swinging movement, through manual or automatic operations, to a position of engagement with the ground or a housed position beneath the trailer frame clear of the ground.

The object of my invention, generally stated, is to simplify such apparatus by utilizing as front supports legs which are rigidly attached to the frame of the trailer and which have thereon ground engaging means vertically adjustable and automatically maintained in locking engagement with said legs to support the weight of the trailer when lowered to the ground incident to uncoupling.

A further object of the invention is to provide front supports for a trailer which are spaced at a substantial distance apart and which have ground engaging means independently movable thereon, whereby incident to uncoupling the trailer from its tractor where the ground is irregular in its contour, the front supports are caused to compensate for the unevenness of the ground therebeneath and to maintain the trailer frame in a substantially level and stable position.

Other objects and advantages characterizing my invention will become more fully apparent from the description of an embodiment or example thereof, including certain modifications, which follows hereinafter, having reference to the accompanying drawings. Of the drawings:

Fig. I represents a side elevation showing a semi-trailer embodying my invention coupled to the rear deck of a tractor and in readiness to be hauled over the streets.

Fig. II represents an enlarged side elevation of the front end of the trailer, showing the same in the relation which it occupies to the rear deck of the tractor just prior to coupling.

Fig. III represents a plan view of portions of the front end of the trailer.

Fig. IV represents a cross section of the same, taken as indicated by the lines IV—IV of Fig. III.

Fig. V represents a detailed view, partly in section and partly in front elevation, showing one of the front supports for the trailer.

Fig. VI represents a view of the same, partly in section and partly in side elevation.

Fig. VII represents a cross section of the lower part of the front support, with the parts housed therein shown in the position which they occupy just prior to the coupling of the trailer with its tractor.

Fig. VIII represents a cross section, taken as indicated by the lines VIII—VIII of Fig. V.

Fig. IX represents a view similar to that of Fig. IV, but showing a modified form of my invention wherein the ground engaging wheels are manually raised and lowered.

Fig. X represents a side elevation of the same.

Fig. XI represents a side elevation of the upper end of the front support shown in Figs. IX and X with portions thereof cut away to show the details of parts otherwise invisible.

Fig. XII represents an enlarged view of the crank arm shown in Fig. X, by means of which the ground engaging wheels are raised and lowered.

Fig. XIII represents an enlarged view, partly in section, of the apparatus for retaining the crank arm in locked position; and, Fig. XIV represents a cross section of the same, taken as indicated by the lines XIV—XIV of Fig. XIII.

With reference initially to Fig. I of the drawings, there is shown a tractor, comprehensively designated at 1, and a semi-trailer of my invention, similarly designated at 2, coupled to the tractor. The coupling apparatus between tractor and trailer selected herein for illustration is in common use and forms no part of this invention. It comprises generally a fifth wheel table 3 on the rear of the tractor 1 having a central curved arm 4 and coupling pin 5. On the front end of the trailer 2 there are castors 6 and larger wheels 7 arranged in pairs and spaced longitudinally, one pair in advance of the other, which are adapted to ride up the inclined rails 8 leading to the fifth wheel table 3 when the tractor 1 is backed, beneath the front end of the trailer 2. As shown in Fig. III, there projects from the front end of the trailer 2 jaws 9 which define a socket 10 into which the coupling pin 5 of the tractor is adapted to enter, the socket 10 and coupling pin 5 forming a swivel joint in the center of the fifth wheel table.

The trailer 2 comprises generally a frame 11 supported on relatively large rear wheels 12 and having at its forward end an adjustable front support including transversely spaced depending legs 13 and relatively small wheels 14, which as hereinafter explained have capacity for vertical movement on the legs 13. In the present example of my invention, I have shown a trailer frame adapted for the carrying of railroad containers or truck bodies. The trailer frame 11 comprises side sills 15, intermediate channel sills 16 and transverse members such as indicated at 17 in Fig. IV. At the corners of the frame 11 upstanding guides 18 are mounted, the guides defining a rectangular seat for a container or truck body. At the forward end of the frame there is a sill including a flat horizontal plate, such as shown at 19 in Fig. III.

As shown most clearly in Fig. III, there extends longitudinally of the trailer frame 11 a movable thrust-bar 20 which has at its forward end a curved surface 21 adapted to strike the coupling pin and to be urged rearward when the coupling pin 5 enters the socket 10 during the operation of connecting the trailer and tractor. The thrust-bar 20 is guided in its movement by rollers 22. At the rear end of the thrust-bar 20 there is a cross piece 23, the ends of which extend through elongated slots 24 in the web portions of the intermediate channel sills 16. Adjacent to the slots 24 there are outwardly projecting flanges 25 upon which the cross piece 23 is guided in its movement. To stiffen the cross piece 23, there are preferably provided diagonal braces 26 joined at their inner ends to a collar 27 on the thrust-bar 20 and terminating at their outer ends in rollers 28 which bear upon the inside web surface of the intermediate channel beams 16. Attached to the ends of the cross piece 23 are wire cables 29 which are connected to the ground engaging wheels 14 in a manner hereafter explained.

When the trailer is uncoupled from its tractor, the thrust-bar 20 and cross piece 23 assume the position shown in Figs. III and IV. On the other hand, when the tractor is backed beneath the front end of the trailer, preparatory to coupling, the coupling pin 5 of the tractor strikes the curved surface 21 at the end of the thrust-bar 20, forcing the thrust-bar rearward as the coupling pin 5 centers itself within the socket 10, causing the cross piece 23 to assume the position shown in broken lines in Fig. III. In like manner, when the tractor is uncoupled, the weight of the ground engaging wheels 14, acting through the cables 29, moves the cross piece 23 and thrust-bar 20 forward to its original position.

Extending transversely of the trailer frame 11, as shown in Fig. IV, there is a shaft 30 mounted in sleeves 31 on the intermediate channel sills 16, and having its ends projecting outward somewhat beyond the intermediate sills. Upon the shaft 30 the legs 13 of the front support are suspended. Diagonal cross braces 13a connect the legs 13 together and stiffen them in a transverse plane. Rearwardly and outwardly inclined struts 32 brace the legs 13 in longitudinal planes. This construction serves to maintain the legs 13 in rigid attachment to the trailer frame 11, and it is to be understood that while for convenience the legs 13 are suspended from a shaft 30, rotation of the legs 13 about this shaft is positively prevented. The structural details of the front support legs 13 are shown clearly in Figs. V, VI and VII. Each leg 13 is provided at its upper end with a sheave 33 which is adapted to turn idly on the shaft 30.

The previously described suspension cables 29 pass over the sheaves 33 and lead downward through the hollow legs for attachment, through mechanism hereafter described, to the supports 34 for the axles 35 of the wheels 14. Each wheel support 34 is in the form of a truck and has thereon two sets of rollers 36 which bear upon vertical surfaces 37 at opposite sides of the interior of the legs 13, the surfaces 37 affording guides for the upward and downward movement of the wheel supports 34. At the outer side of each leg 13 a vertical slot 38 is provided within which the wheel support 34 may freely travel in its upward and downward movement, the upper and lower ends of this slot limiting the extent of such movement. A bottom cover plate 39 is bolted to the lower end of each leg 13. With removal of the cover plate 39, the interior mechanism of the legs can be removed in an obvious manner. At the upper end of each leg a guard 55 is associated with the sheave 33 to insure that the cable 29 will not become disengaged therefrom.

Connected to the upper end of each wheel support 34, there is a stirrup 40 carrying pins 41 on which locking pawls 42 are pivotally mounted. The locking pawls 42 are adapted to engage the teeth of racks 43 disposed in opposite relation at the inside of the central portion of the leg 13. The locking pawls 42 have integral therewith projections 44 to which links 45 are pivoted. The links 45 are in turn pivoted at their inner ends to a pin 46 which is carried by a clevis 47. An operating rod 48 has its lower threaded end screwed into the clevis 47. At its upper end the operating rod 48 is attached to a yoke 49 which forms the terminus of the suspension cable 29.

Surrounding the clevis 47 and the operating rod 48, there is a bushing 50. An additional bushing 51 is mounted above the bushing 50, and between the flanged ends of the two bushings 50, 51 there is interposed a helical spring 52. The upper bushing 51 in turn bears upon a yoke 53 which is connected at its lower end to the wheel support 34 by means of a pin 54. It will be apparent that the links 45 and locking pawls 42 form a toggle mechanism through which the wheel support 34 is suspended on the wire cable 29. The helical spring 52 tends to spread this toggle mechanism to cause the pawls 42 to move outwardly into locking engagement with the teeth of the racks 43. When, however, the wheels 14 are off the ground, and there is tension on the cable 29, the weight of the wheel 14 will overcome the pressure of the spring 52 and cause the pawls 42 to be contracted and disengaged from the rack 43.

The operation of the above described front support is as follows. With the trailer 2 uncoupled from its tractor 1, and its weight resting on the front wheels 14, the interior mechanism of the legs 13 assumes the position shown in Fig. VI. The pawls 42 are spread outwardly in locking engagement with the racks 43 and the cables 29 are slack. When the tractor is backed beneath the front end of the trailer, the castors 6 and wheels 7 ride up on the inclined rails 8 to the position shown in Fig. II, the front end of the trailer is raised a slight distance, relieving the front support mechanism of load. This permits the wheel supports 34 to fall by gravity to a position in which the bottom rollers 36 rest upon the bottom cover plate 39. This action causes the pawls 42 to be partially released from the racks 43. Further backing of the tractor causes the coupling pin 5 of the same to contact with the curved surface 21 at the forward end of the thrust-bar 20, pushing the thrust-bar 20 rearward until the coupling is completed, at which time the tractor and trailer assume the relation shown in Fig. I. The thrust-bar 20 in traveling rearward moves the cross piece 23 to the position indicated in broken lines in Fig. III, the cables 29 being simultaneously carried rearward. With the rearward pulling of the cables 29 over the sheaves 33, the operating shaft 48 is moved vertically upward compressing the spring 52 until the bushings 50 and 51 contact with each other, thus causing the pawls 42 to be drawn together and entirely disengaged from the racks 43. At this point, the toggle mechanism assumes the position shown in Fig. VII. When the bushings 50 and 51 contact with each other, the load of the wheels 14 is carried directly through the yoke 47.

As long as the tractor is coupled to the trailer, the wheels 14 are necessarily locked in raised position, for the thrust-bar 20 is restrained against movement by virtue of its contact with the coupling pin 5 on the tractor. When the tractor is uncoupled from the trailer, the thrust-bar 20 is free to move under the influence of the weight of the wheels 14. The wheels fall by gravity until they contact with the roadway or until the wheel supports 34 strike the bottom cover plates 39 on the lower ends of the legs 13. Where the roadway is uneven, as indicated in Fig. IV, the wheels 14 will fall first simultaneously and then independently, each wheel dropping downward until it strikes the ground and there being automatically locked to its leg 13. By having each wheel 14 thus fall independently, incident to the uncoupling operation, the frame 11 of the trailer is maintained on a level plane regardless of the unevenness of the ground beneath its front end. This reduces to a minimum twisting stress on the frame members and causes the frame to be maintained at a uniform coupling height. With the weight of the trailer on the wheels 14, the pawls 42 are securely locked to the racks 43 and cannot be released until the front end of the trailer is raised.

In Figs. IX to XIV, inclusive, there is shown a modified form of my invention in which the raising and lowering of the wheels 14 is accomplished manually, rather than automatically as in the previously described example. In this construction, the legs 13 are of the same form and are mounted on the underside of the trailer frame 11 in a slightly different manner. Beneath the trailer frame 11, brackets 56 and 57 are provided accommodating between them shafts 58 upon which the legs 13 are suspended. In this example, the legs 13 are mounted on the shafts 58 with the shafts inserted in the openings 59 at the extreme upper ends of the legs, whereas in the previously described example, the circular openings 60 formed the bearings at which the legs were supported. In this example, struts 61 brace the legs 13 in longitudinal planes, and diagonal braces 62 brace the legs 13 in a transverse plane. Thus the legs 13 are rigidly attached to the trailer frame 11. At the upper end of each leg 13 there is a sheave 63 which serves as a drum to which the end of the wire cable 29a is attached by an anchor 64. A guard 65 is preferably associated with the sheave 63 to insure the winding of the cable 29a thereon. The sheave 63 is keyed to the shaft 58. Each shaft 58 terminates in a crank handle 66 by means of which the corresponding sheave 63 may be turned. Adjacent to the brackets 56 at each side of the trailer frame 11, there are provided depending handle catches 67 by means of which the crank handles 66 may be locked when the wheels 14 are raised.

As shown clearly in Figs. XIII and XIV, each handle catch 67 has a U-shaped mouth 68 into which the crank handle 66 is adapted to swing. At the entrance to the mouth 68 there is provided a latch 69 which normally rests upon a ledge 70. In order to raise a wheel 14 on its leg 13, the crank handle 66 is moved from the position shown in broken lines in Figs. X and XI in a clockwise direction to the position shown in full lines. As the crank handle 66 enters the mouth 68 of the handle catch 67, it raises the latch 69 and is moved upward to the position shown in broken lines at 71. The latch 69 is then permitted to fall downward to strike the ledge 70, and the crank handle 66 is retained in the handle catch 67.

The interior mechanism of the legs 13, when the raising and lowering of the wheels 14 is effected manually, operates in the same manner, as previously described with reference to the automatic operation. Briefly this operation is as follows. When the trailer is uncoupled from the tractor and rests on the wheels 14, the tractor is backed under the front end of the trailer and raises the same, and thus relieves the front support mechanism of load. This permits the wheel support 34 to drop and it causes the pawls 42 to be partially released from the rack 43. The operating shaft handle 66 is then rotated 180° toward the front of the trailer, thereby rotating the sheave 63 and pulling the cables 29a upward within the legs 13, thus raising the wheels 14. Each wheel 14 is independently raised, and when the crank handle 66 has been rotated to the limit of its travel, it is engaged and locked by the latch 69.

To uncouple the tractor from the trailer, the crank handle 66 is raised sufficiently to permit the latch 69 to be swung up by the fingers, thus allowing the handle to pass by the latch. The wheels 14 then drop of their own weight until the wheel supports 34 strike the cover plates 39 at the base of the legs 13, or until the wheels 14 strike the ground. Where the ground is irregular, one wheel 14 will fall to a point below that of the other wheel, and when the tractor is moved away, each wheel support 34 will be locked to its leg 13 with the pawls 42 of one leg engaging with certain teeth of the rack 43, and the pawls 42 of the other leg engaging teeth at a different level in the other rack, and with the frame of the trailer in level position. The tractor is then uncoupled and the weight is transferred from the tractor to the legs 13, locking the pawls 42 in place.

While I have described one example of the practice of my invention and a modification thereof, showing both automatic and manual operation of adjustable front supports for a trailer, it will be apparent that various changes may be made in the form of the apparatus herein described and illustrated, and that certain features of the invention may be used at times to advantage without a corresponding use of other features, all without departing from the spirit of my invention as defined in the annexed claims.

Having thus described my invention, I claim:

1. In a trailer vehicle, including a frame having rear wheels and having at its forward end means adapted for coupling connection with a tractor, a front support comprising spaced legs rigidly attached to said frame, ground engaging means movable vertically on said legs, and mechanism whereby said ground engaging means are automatically raised clear of the ground when the frame is coupled to a tractor and are automatically and independently lowered and locked to said legs when the frame is uncoupled.

2. In a trailer vehicle, including a frame having rear wheels and having at its forward end means adapted for coupling connection with a tractor, a front support comprising spaced legs rigidly attached to said frame, ground engaging means movable vertically on said legs, and mechanism whereby said ground engaging means are automatically raised and held clear of the ground when the frame is coupled to a tractor, said ground engaging means being adapted when released incident to uncoupling of the frame to fall by gravity independently to the ground and to become locked to their legs in the positions to which they have fallen.

3. In a trailer vehicle, including a frame having rear wheels and having at its forward end means adapted for coupling connection with a tractor, a front support comprising spaced legs depending from said frame, wheels movable vertically on said legs and each adapted to be locked to its leg in any one of a series of different positions, and mechanism whereby said wheels are automatically raised and held clear of the ground when the frame is coupled to a tractor, said wheels being adapted when released incident to uncoupling of the frame to fall by gravity independently to the ground and to become locked to their legs in the positions to which they have fallen, thereby compensating for irregularities in the ground and maintaining the forward end of the trailer in a substantially level position.

4. In a trailer vehicle, a wheeled frame having at its forward end means adapted for coupling connection with a tractor including a bar movable rearwardly on said frame incident to coupling and movable forwardly on said frame incident to uncoupling, a front support comprising spaced legs rigidly attached to said frame, ground engaging means movable vertically on said legs and each adapted to be locked to its leg in any one of a series of different positions, and apparatus connecting said bar with said ground engaging means whereby said ground engaging means are automatically raised incident to the coupling of the trailer to the tractor and automatically released to fall independently by gravity incident to uncoupling.

5. In a trailer vehicle, a wheeled frame having at its forward end means adapted for coupling connection with a tractor including a bar movable rearwardly on said frame incident to coupling and movable forwardly on said frame incident to uncoupling, a cross piece attached to said bar and guided for movement on said frame, a front support comprising legs depending from said frame, wheels movable vertically on said legs, and flexible cables for connecting said wheels with the cross piece aforesaid.

6. In a trailer vehicle, a wheeled frame having at its forward end means adapted for coupling connection with a tractor including a bar movable rearwardly on said frame incident to coupling and movable forwardly on said frame incident to uncoupling, a cross piece attached to said bar and guided for movement on said frame, a front support comprising legs depending from said frame, wheels movable vertically on said legs, rack and pawl mechanism whereby said wheels may be locked to said legs when the frame is supported thereon, and cables for connecting said wheels with the cross piece aforesaid whereby said wheels are raised on said legs incident to rearward movement of the cross piece.

7. In a trailer vehicle, a frame having rear wheels, a front support comprising a leg rigidly attached to said frame and having a rack thereon, and ground engaging means movable vertically on said legs, a cable for raising and lowering said ground engaging means with respect to said legs, toggle mechanism including a pivoted pawl adapted to engage the rack aforesaid, and a spring tending to spread said toggle mechanism to maintain said pawl in engagement with said rack.

8. In a trailer vehicle, a frame having rear wheels, a front support comprising hollow legs rigidly attached to said frame and provided with racks at the inside thereof, ground engaging wheels, and supports for the axles of said wheels movable vertically within said legs, cables for raising and lowering said wheel supports with respect to said legs, toggle mechanism including pivoted pawls adapted to engage the racks aforesaid, springs tending to spread said toggle mechanism to maintain said pawls in locking engagement with said racks, and means whereby when the trailer frame is raised the weight of said wheels overcomes the pressure of said springs to contract said toggle mechanism and disengage said pawls from said racks.

9. In a trailer vehicle, a frame having rear wheels, a front support comprising spaced legs rigidly attached to said frame and having racks thereon, ground engaging means movable vertically on said legs, drums at the upper ends of said legs, suspension cables leading from said ground engaging means to said drums, toggle mechanism connecting said suspension cables to said ground engaging means including a pivoted pawl adapted to engage the rack aforesaid, a spring tending to spread said toggle mechanism to maintain said pawl in engagement with said rack, and crank handles for turning said drums.

10. In a trailer vehicle, a frame having rear wheels, a front support comprising spaced legs rigidly attached to said frame and having racks thereon, ground engaging means movable vertically on said legs, drums at the upper ends of said legs, suspension cables leading from said ground engaging means to said drums, toggle mechanism connecting said suspension cables to said ground engaging means including a pivoted pawl adapted to engage the rack aforesaid, a spring tending to spread said toggle mechanism to maintain said pawl in engagement with said rack, crank handles for turning said drums whereby the ground engaging means may be independently raised on said legs, and means for locking said crank handles to the frame to maintain said ground engaging means in raised position.

11. In a trailer vehicle, including a frame having rear wheels and having at its forward end means adapted for coupling connection with a tractor, a front support comprising spaced hollow legs rigidly attached to said frame, said legs having vertical slots in the sides thereof, ground engaging wheels at the sides of said legs, and supports for the axles of said wheels extending through said slots and having rollers guided for vertical movement within said legs.

ISAAC M. CHAMBERS.